United States Patent
De La Chapelle et al.

(10) Patent No.: US 6,556,808 B1
(45) Date of Patent: Apr. 29, 2003

(54) FIXED GROUND TRACK SATELLITE CONSTELLATION AND USER TERMINAL

(75) Inventors: Michael De La Chapelle, Bellevue, WA (US); Charles R. Hargraves, Renton, WA (US); Timothy A. Olcott, Maple Valley, WA (US); Terry L. Raubenstine, Seattle, WA (US); Ira J. Clue, Renton, WA (US); Charles C. Barclay, Renton, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/224,561

(22) Filed: Dec. 30, 1998

(51) Int. Cl.⁷ .............................................. H04B 7/185
(52) U.S. Cl. ................. 455/12.1; 244/158 R; 455/13.1; 342/354
(58) Field of Search ................................ 455/12.1, 13.1, 455/13.2, 456, 13.3; 244/158 R, 164; 342/354, 358, 450

(56) References Cited

U.S. PATENT DOCUMENTS

| | | | |
|---|---|---|---|
| 3,340,531 A | * 9/1967 | Kefalas et al. ............... 343/353 |
| 4,809,935 A | * 3/1989 | Draim ..................... 244/158 R |
| 5,075,682 A | * 12/1991 | Dehnert ...................... 342/352 |
| 5,119,225 A | * 6/1992 | Grant et al. ................. 359/172 |
| 5,551,624 A | 9/1996 | Horstein et al. |
| 5,579,536 A | * 11/1996 | Stackman et al. ........... 455/517 |
| 5,582,367 A | * 12/1996 | Castiel et al. ............... 244/158 |
| 5,621,415 A | * 4/1997 | Tuck .......................... 342/354 |
| 5,722,042 A | 2/1998 | Kimura et al. |
| 5,729,240 A | * 3/1998 | Bourgeois ................... 343/763 |
| 5,765,098 A | 6/1998 | Bella |
| 5,797,083 A | 8/1998 | Anderson |
| 5,867,783 A | * 2/1999 | Horstein et al. ............. 455/427 |
| 5,931,417 A | * 8/1999 | Castiel ....................... 244/158 |
| 5,978,653 A | * 11/1999 | Taylor et al. .............. 455/13.1 |
| 6,019,318 A | * 2/2000 | Cellier et al. ............... 244/158 |
| 6,078,284 A | * 6/2000 | Levanon ..................... 342/357 |
| 6,085,090 A | * 7/2000 | Yee et al. .................... 455/440 |
| 6,088,571 A | * 7/2000 | Kane et al. ................. 455/12.1 |
| 6,097,929 A | * 8/2000 | Hassall et al. ............. 455/12.1 |
| 6,102,335 A | * 8/2000 | Castiel et al. ............... 244/158 |
| 6,122,596 A | * 9/2000 | Castiel ....................... 701/226 |
| 6,126,116 A | * 10/2000 | Cellier ....................... 244/158 |
| 6,198,907 B1 | * 3/2001 | Torkington et al. ........ 455/12.1 |

FOREIGN PATENT DOCUMENTS

| | | | |
|---|---|---|---|
| EP | 0 588 697 | | 3/1994 |
| EP | 0 601 293 | | 6/1994 |
| EP | 0601293 A | * | 6/1994 |
| EP | 0 836 290 | | 4/1998 |
| FR | 2 685 833 | | 7/1993 |

OTHER PUBLICATIONS

Wang, Chia–Jiu: "Structural Properties of a Low Earth Orbit Satellite Constellation—The Walker Delta Network"—Proceedings of the Annual Military Communications Conference (MILCOM), US, New York, IEEE, vol. CONF. 12, 1993, pp. 968–972, XP000410896, p. 968, right–hand column, line 21—p. 969, left–hand column, line 5.

* cited by examiner

Primary Examiner—Nay Maung
Assistant Examiner—Joy K. Contee
(74) Attorney, Agent, or Firm—Lawrence W. Nelson

(57) ABSTRACT

A satellite communication system includes a constellation of non-geostationary orbiting satellites following a fixed ground track on the earth, and ground terminals having substantially continuous visibility to at least one of the satellites in a single ground track. Each of the satellites in the constellation follows a single substantially linear track across the sky when observed from the earth. In a preferred embodiment, the system can also include ground terminals which have an antenna with a single axis of scanning motion. In this embodiment, satellites have repeating ground tracks wherein a satellite completes n orbital revolutions each time the earth rotates through 360 degrees, wherein n is an integer between 2 and 15, inclusive.

11 Claims, 4 Drawing Sheets

VIEW FROM GROUND LOOKING UP

EVEN REVS PER DAY (EX. 12)

ODD REVS PER DAY (EX. 13)

SPACETRACK

ALTITUDE: ~881km
S/C:~498
HAS SLIGHT COVERAGE GAPS!

GROUNDTRACK
FIELD-OF-VIEW ABOVE 40°
ELEVATION ANGLE ALSO SHOWN

SPACETRACK

ALTITUDE: ~1666km
S/C:~263
PROVIDES FULL COVERAGE!

GROUNDTRACK
FIELD-OF-VIEW ABOVE 40°
ELEVATION ANGLE ALSO SHOWN

SPACETRACK

ALTITUDE: ~2706km
S/C:~160
PROVIDES FULL COVERAGE

GROUNDTRACK
FIELD-OF-VIEW ABOVE 40°
ELEVATION ANGLE ALSO SHOWN

SPACETRACK

ALTITUDE: ~4163km
S/C:~102
PROVIDES FULL COVERAGE!

GROUNDTRACK
FIELD-OF-VIEW ABOVE 40°
ELEVATION ANGLE ALSO SHOWN

FIXED GROUND TRACK SATELLITE CONSTELLATION AND USER TERMINAL

FIELD OF THE INVENTION

This invention is in the field of communication satellite systems, and more specifically, in the field of non-geostationary orbit (NGSO) satellite systems.

BACKGROUND OF THE INVENTION

The commercial success of NGSO satellite communication systems is heavily dependent on the cost and size of user terminals. The cost of the user terminal represents a significant financial hurdle for the establishment of service to the consumer. Small size of the user terminal, especially the outdoor unit comprising the antenna, is very important to ease of installation, appearance and compliance with local building codes.

A well-known problem with high data rate LEO (Low Earth Orbit) satellite communication systems is that the ground terminal requires a high gain antenna that tracks the satellites as they pass overhead. A LEO constellation having several satellites in each orbit plane would require a ground terminal antenna that could scan in two dimensions over all of space over some particular elevation angle. A typical scan pattern for such a system is shown in FIG. 1. From the perspective of a user at a fixed position on earth, the rotation of the earth causes a rising satellite to have a ground track that is slightly westerly from that of the preceding satellite. After a satellite sets, a retrace is required to acquire the next rising satellite. To avoid loss of data, the retrace must be nearly instantaneous. For this reason, the terminal must have two mechanically scanning antennas, with one tracking a satellite while the other antenna is retracing. A single antenna would not be able to retrace rapidly enough to avoid data loss. The need for two antennas translates into high user terminal costs and large size.

Systems using geostationary satellite orbits can operate with lower cost user terminals that use simple fixed pointing antennas. Examples of such antennas (direct broadcast satellite television antennas for example) are common on the rooftops of residential and commercial buildings. The success of direct broadcast satellite systems (such as those marketed under the names DirectTv™ and DirectPC™, for example) is largely dependent on the low cost and small size of the user terminals. GEO systems like these utilize a higher cost space segment in order to reduce the cost of the ground segment (i.e., user terminals). The high cost of the space segment is attributed to launching into GEO orbits and the use of high EIRP transponders. This enables the use of fixed position (non-scanning) antennas of small size in the user terminals.

Despite the user terminal cost advantage of having fixed position antennas, broadband GEO satellite systems have a distinct performance disadvantage relative to LEO (low earth orbit) systems. The latency introduced by the signal propagation delay in GEO systems causes inefficiencies in data communication protocols such as TCP/IP. Therefore, there is recent interest in broadband LEO systems. LEO systems have been proposed with user terminals having antennas, which scan over two axes, as discussed above, resulting in greater size and cost. But, user terminals, which are larger and more costly than those needed for GEO systems, can present an obstacle to consumer acceptance of LEO systems.

BRIEF SUMMARY OF THE INVENTION

This invention achieves lower ground segment cost for LEO systems by providing a system using advantageous LEO orbits in a unique and novel manner. A preferred embodiment of the invention enables small, low cost user terminals by providing a constellation of satellites with substantially continuously repeating ground tracks over the entire earth for user elevation angles greater than zero. This constellation design enables lower cost user terminal antennas by requiring only one axis of scan (elevation) instead of the two axes (azimuth & elevation) usually required for NGSO satellite constellations.

In a preferred embodiment, the invention uses a constellation of satellites that result in reduced cost of the ground segment. The next best thing to a user terminal with a fixed position GEO antenna is one with an antenna that scans in only one axis, rather than the two axes normally required for NGSO antennas. The preferred embodiment of the invention enables use of such an antenna by providing a constellation of satellites in repeating ground track orbits. This type of constellation enables lower cost user terminals while achieving low latency with LEO orbits.

In one embodiment, a satellite communication system includes a constellation of non-geostationary orbiting satellites following a fixed ground track on the earth, and ground terminals having substantially continuous visibility to at least one of the satellites in a single ground track. In this embodiment, each of the satellites follows a single substantially linear track across the sky when observed from the earth. In a preferred embodiment, the system can also include ground terminals, which have an antenna with a single axis of scanning motion. In the system of this embodiment, satellites have repeating ground tracks wherein a satellite completes n orbital revolutions each time the earth rotates through 360 degrees, wherein n is an integer between 2 and 15, inclusive.

DETAILED DESCRIPTION OF THE DRAWINGS

A preferred embodiment of the invention provides a constellation of satellites that substantially continuously provide repeating ground tracks over the entire earth for user elevation angles greater than zero. In the preferred embodiment, satellites follow one another on the same continuous ground track, so that the constellation can be likened to a giant "train" that wraps many times around the earth, with the beginning of the "train" connected to the end. A constellation with high elevation angles is preferable for broadband LEO systems so that links can be closed with small and inexpensive user terminals. Also, the orbit altitude is preferably less than 5000 km to achieve low communication latency, an important factor for some commonly used data communications protocols such as TCP/IP. For these systems to be truly global, worldwide coverage is highly preferred.

Figure 1:
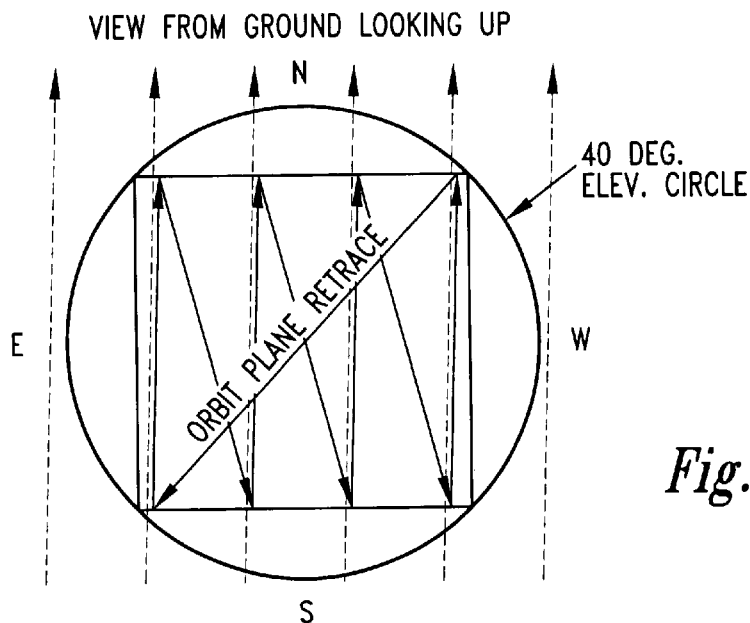
FIG. 1 is a schematic diagram of a scan pattern for a LEO system.
Figure 2A:
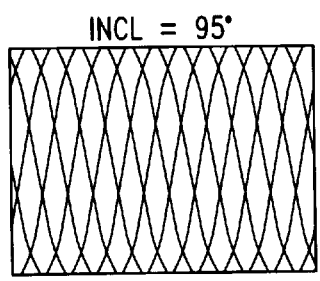
FIG. 2 shows ground tracks for constellations having 12 revs per day, and inclinations of approximately 95, 90 and 85 degrees.
Figure 2B:
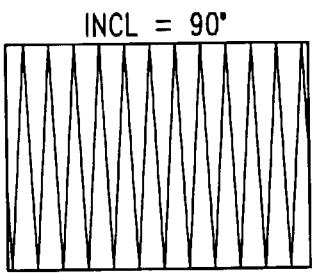
Figure 2C:
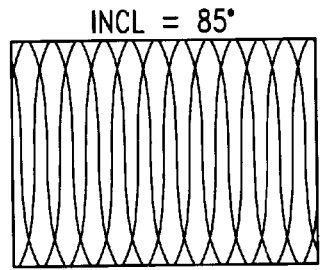
Figure 3A:
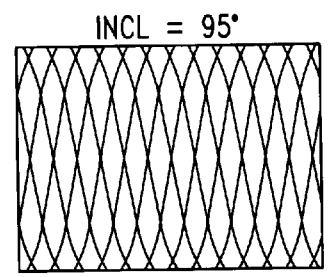
FIG. 3 shows ground tracks for constellations having 13 revs per day, and inclinations of approximately 95, 90 and 85 degrees.
Figure 3B:
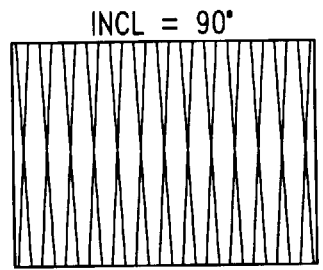
Figure 3C:
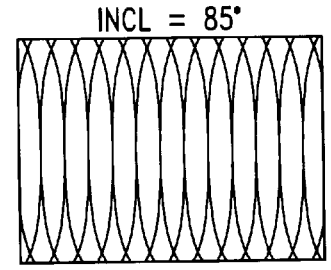
Figure 4A:
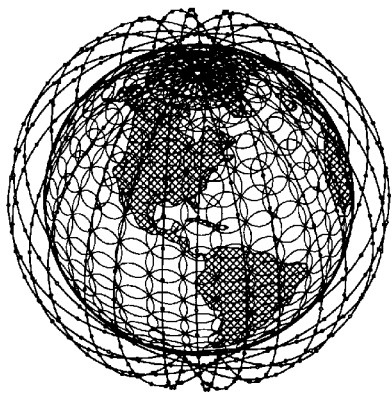
FIG. 4 is a diagram of a repeating ground track constellation at approximately 881 km altitude.
Figure 4B:
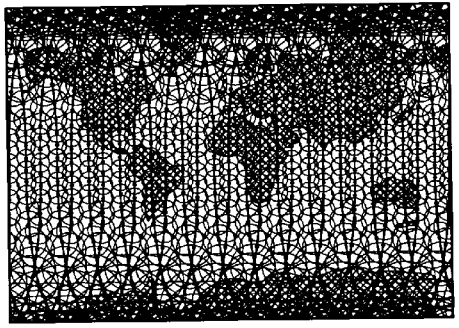
Figure 5A:
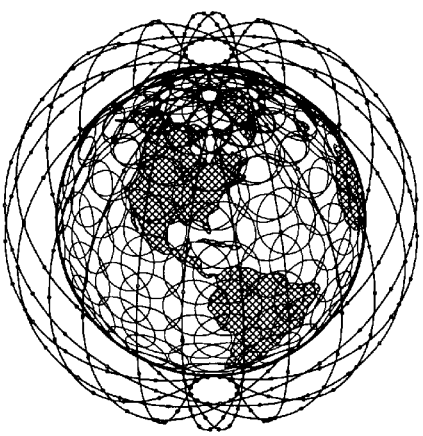
FIG. 5 is a diagram of a repeating ground track constellation at approximately 1666 km altitude.
Figure 5B:
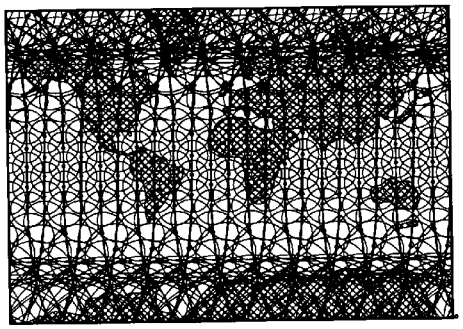
Figure 6A:
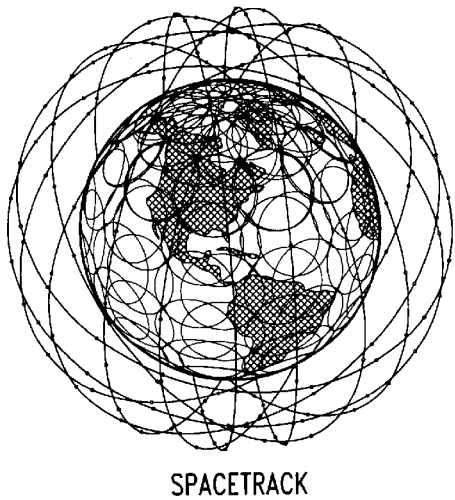
FIG. 6 is a diagram of a repeating ground track constellation at approximately 2706 km altitude.
Figure 6B:
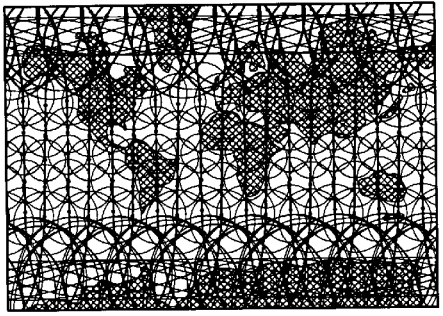
Figure 7A:
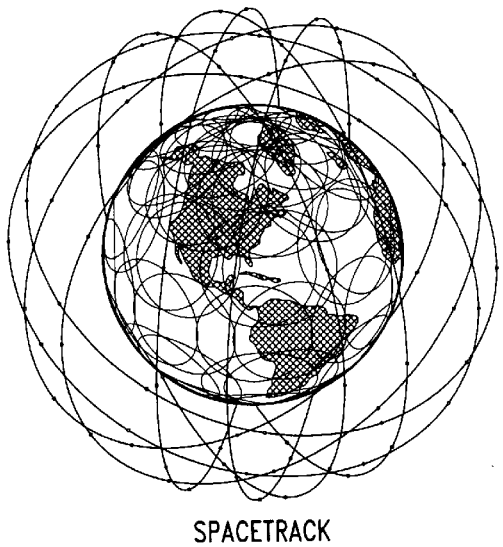
FIG. 7 is a diagram of a repeating ground track constellation at approximately 4163 km altitude.
Figure 7B:
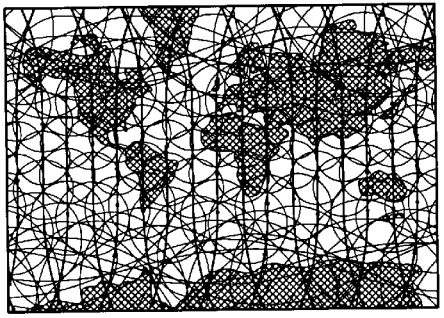

Polar or near polar orbits in the range of approximately 85 to 95 degrees inclination are preferable for the global coverage they provide. Repeating ground track orbits with an even number of revolutions per day are preferable. FIGS. 2 and 3 show the ground tracks for 3 different inclinations (95, 90, 85 degrees) and 12 and 13 orbit revolution per day, respectively. A constellation with an 85 degree inclination and an even number of revolutions per day (as in FIG. 2.c) is advantageous because this constellation had a reduced probability of collision between satellites and evenly spaced ground tracks at the lower latitudes, as can be seen in FIG. 2.c. Even numbers of orbit revolutions are advantageous in this invention because they provide evenly spaced ground tracks at lower latitudes.

Four embodiments of constellations that have repeating ground tracks and that provide full earth coverage above 40 degrees elevation angle are shown in FIGS. 4–14 7, and summarized in Table 1, below. Constellations having these characteristics and even numbers of revolutions per day occur at discrete altitudes.

TABLE 1

| # Revs per day | # Satellites | Approximate Circular Altitude (km) |
|---|---|---|
| 14 | 498 | 881 |
| 12 | 263 | 1666 |
| 10 | 160 | 2706 |
| 8 | 102 | 4163 |

In odd revolution per day orbits the satellites travel in opposite directions along the same track. While this may appear to be infeasible due to the probability of collision, for the near polar orbits, reduced inclination orbits are feasible at odd revs per day. Embodiments of odd rev orbits where the collision potential is not a problem are shown below in Table 2.

TABLE 2

| # Revs per day | # Satellites | Approximate Circular Altitude (km) |
|---|---|---|
| 13 | 352 | 1248 |
| 11 | 203 | 2147 |
| 9 | 128 | 3367 |
| 7 | 82 | 5144 |

Other embodiments include constellations with 2 and with 15 revolutions per day at approximate circular orbital altitudes of 20,184 km and 554 km, respectively. It will be understood that the embodiments given above are exemplary, and that other constellation configurations may fall within the scope of the inventive concept.

These constellations are very efficient in the number of satellites required for global coverage and they compare favorably to other phased constellations such as the Walker constellation. In the constellations according to the preferred embodiment, the satellites follow one another on the same ground tracks so the constellation is like a giant "train" that wraps many times around the earth with the beginning of the "train" connected to the end of the "train".

To achieve a repeating ground track, the satellites all must be at approximately the same altitude. To avoid collisions, accurate station keeping is required because satellites must cross tracks near the poles. Station keeping requirements for the preferred constellation are achievable with current technology known to those skilled in the art.

In a preferred embodiment of the invention, each satellite occupies a different orbit plane (right ascension of the ascending node (RAAN)). While this makes it more difficult to launch multiple satellites on the same launch vehicle and makes on-orbit sparing more difficult, the preferred constellations in FIGS. 4–7 have adjacent satellite tracks moving in the opposite directions. In other words, the north-south satellite tracks alternate between ascending and descending satellites. This makes east-west inter-satellite communication somewhat more difficult because adjacent satellites are moving in opposite directions. However, the resulting reduction in user terminal cost for repeating ground tracks more than compensates for these attributes.

From the user's perspective, the preferred embodiment provides a system where the satellites pass overhead in the exact same track. So the user need only have a clear field of view along a line rather than a much larger two-dimensional area. This is a big advantage in regions having trees, mountainous terrain or tall buildings. Also, it is much easier to site a user terminal when the clear field requirements are one dimensional rather than two dimensional.

It is expected that the preferred embodiment will lead to lower antenna cost. The need to have only a single axis of scan, rather than the 2 axes normally required for NGSO constellations, can reduce the user terminal unit cost by more than $100. Multiply this cost saving by 10 million user terminals and the systems savings can easily exceed $1 billion. Thus, the cost savings to the ground segment potentially can offset higher launch and sparing costs.

Still another advantage of a preferred embodiment is the smaller outdoor unit (ODU) size. The ODU contains antenna (s), high power amplifier (HPA) and low noise amplifier LNA). The ODU is typically mounted on high structures to achieve a clear field of view. Installation is more expensive and dangerous if the ODU is big and heavy. This preferred embodiment could be used with smaller and lighter ODUs because it can be used with antennas that scan in only one axis instead of two. Small size is important for consumer acceptance for aesthetic reasons and because local codes or other regulations often prohibit large antennas.

Figure 8:
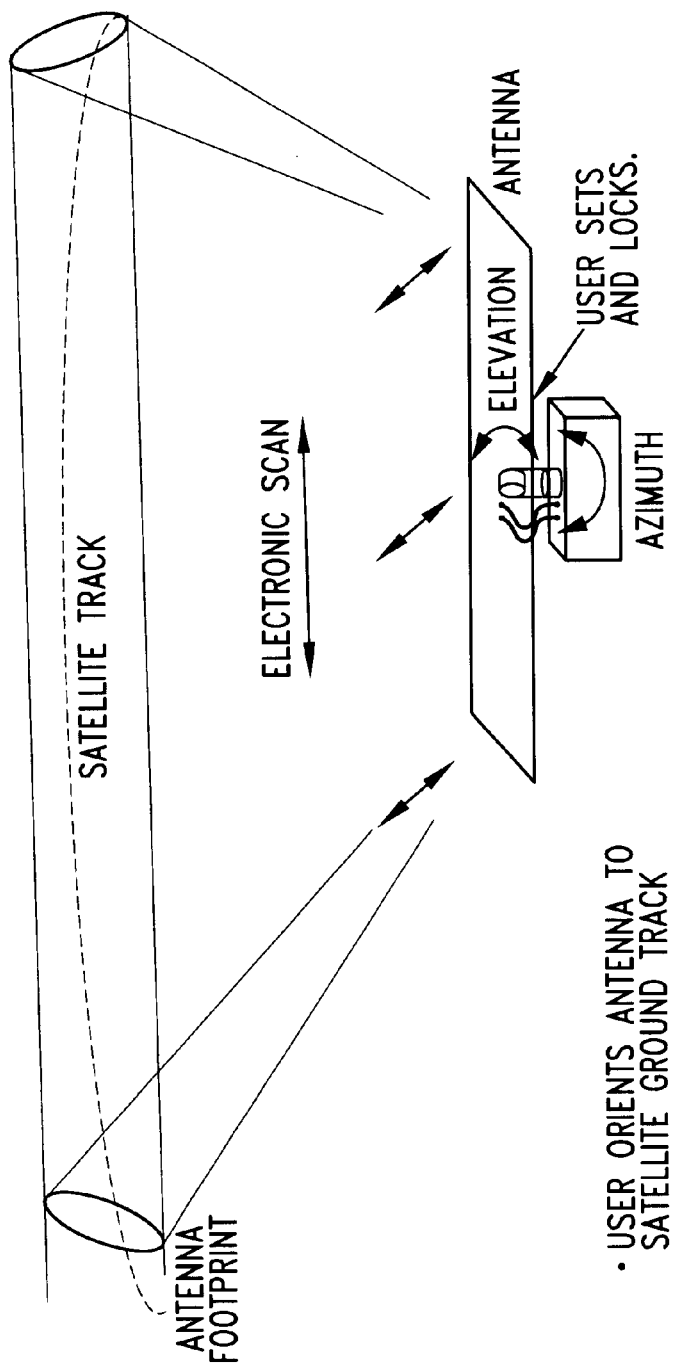
FIG. 8 illustrates an example of 1-D electronic scan user terminal antenna, according to a preferred embodiment.

FIG. 8 shows an example of an antenna that electronically scans along the satellite's overhead track. Fixed position azimuth and tilt control mechanisms must be adjusted to align the electronic scan to the satellite track. Once the proper tilt and azimuth settings are determined, these controls are locked into place during installation. The azimuth control can be set with the use of a compass to orient the antenna to the north-south satellite track. The tilt control allows for east-west adjustment for the particular satellite track across a location.

If a satellite track happens to directly cross a user terminal on the earth, then the satellite sky track is a straight line and the antenna tilt is set to zero so the antenna is pointed straight up. A user terminal that is half way between tracks will have to set the tilt control to its maximum position, at the equator, to align the electronic scan to the satellite sky track. Satellite sky tracks that do not pass directly overhead (i.e., they pass east or west of zenith) are slightly arched rather than straight lines. The more east or west the track, the greater the curvature. The deviations from a straight line are actually small, however, and can be compensated for by elongating the antenna beam in the E-W direction and reducing the beam angle in the N-S direction. This is accomplished by sizing the antenna aperture to be larger in the N-S direction than the E-W direction.

A preferred embodiment of the UT antenna uses a phased array to electronically scan in the N-S direction. This allows for fast retrace to the rising satellite without missing any data. Fixed position azimuth and tilt controls are also required, as previously mentioned. The ODU is comprised of separate transmit and receive antenna enclosed in a common radome.

The preferred embodiment would potentially be particularly advantageous for constellations with relatively fewer satellites and a relatively large ground segment (many UTs). For such constellations, ground segment savings would be expected to offset any cost increase attributable to launch and sparing issues.

The preferred embodiment of the invention is further potentially advantageous for simplification of network management. Since the satellites fly over the same ground track, the traffic load is more predictable compared to the prior art satellite constellations that have the satellite footprint (coverage area) registering in any way on the earth. The prior art approaches make it very difficult or even impossible to allocate long term sustainable capacity to a region because the satellite tracks over the earth are different for each pass over a region.

At lower orbit inclinations there can be multiple satellite tracks over a region at high latitudes. It is therefore possible for users to be assigned to a specific track when more than one is available. This may be useful for balancing the traffic load between satellites in a congested region.

Although the present invention has been described in connection with the preferred embodiments thereof, it is to be noted that various changes and modifications will be apparent to those skilled in the art. Such changes and modifications may be included within the scope of the present invention as defined by the claims set forth below.

What is claimed is:

1. A constellation of satellites comprising:
    a plurality of non-geostationary low earth orbit satellites in circular orbit around earth; and
    a substantially continuous ground track provided by one of said plurality of satellites following one another;
    wherein each of said plurality of satellites has an even number of revolutions around the earth per day; and
    wherein said ground track is substantially stationary with respect to a given position on the earth's surface.

2. A constellation according to claim 1 wherein said plurality of satellites is at an orbital altitude of approximately 881 kilometers.

3. A constellation according to claim 1 wherein said plurality of satellites is at an orbital altitude of approximately 1666 kilometers.

4. A constellation according to claim 1 wherein said plurality of satellites is at an orbital altitude of approximately 2706 kilometers.

5. A constellation according to claim 1 wherein said plurality of satellites is at an orbital altitude of approximately 4163 kilometers.

6. A satellite constellation for use with ground terminals comprising:
    a plurality of non-geostationary orbiting satellites, each of the satellites occupying a different orbital plane, having the property that each of said satellites follows a fixed ground track on the earth, wherein each of said satellites in said constellation follows a single substantially linear track across the sky when observed from the earth, and wherein for each of said satellites within said fixed ground track, one of said satellites follows another one of said satellites to provide a substantially continuous ground track; and
    said ground terminals each having substantially continuous visibility to at least one of said satellites in a single ground track.

7. A satellite constellation for use with ground terminals comprising:
    a plurality of non-geostationary orbiting satellites having the property that each of said satellites follows a fixed ground track on the earth, wherein each of said satellites in said constellation follows a single substantially linear track across the sky when observed from the earth, and wherein for each of said satellites within said fixed ground track, one of said satellites follows another one of said satellites to provide a substantially continuous ground track; and
    said ground terminals each having substantially continuous visibility to at least one of said satellites in a single ground track, and wherein said constellation operates with user terminals employing high gain antennas with a single axis of scanning motion.

8. A satellite constellation with ground terminals comprising:
    a plurality of non-geostationary orbiting satellites having the property that each of said satellites follows a fixed ground track on the earth, wherein for each of said satellites within said fixed ground track, one of said satellites follows another one of said satellites to provide a substantially continuous ground track, wherein said satellites have repeating ground tracks wherein a satellite completes n orbital revolutions each time the earth rotates through 360 degrees, wherein n is an integer between 2 and 15, inclusive; and
    said ground terminals each having substantially continuous visibility to at least one of said satellites in a single ground track.

9. A satellite communication system comprising:
    a constellation of low earth orbit non-geostationary orbiting satellites which follow one another in a substantially continuous ground track on the earth, each of the satellites occupying a different orbital plane, and wherein each of said satellites in said constellation follows a single substantially linear track across the sky, and
    a plurality of ground terminals, each having substantially continuous visibility to at least one of said satellites in a single ground track.

10. A satellite communication system comprising:
    a constellation of low earth orbit non-geostationary orbiting satellites which follow one another in a substantially continuous ground track on the earth, and wherein each of said satellites in said constellation follows a single substantially linear track across the sky when observed from the earth, and
    a plurality of ground terminals, each having substantially continuous visibility to at least one of said satellites in a single ground track, wherein each of said ground terminals includes an antenna with a single axis of scanning motion.

11. A satellite communication system comprising:

a constellation of low earth orbit non-geostationary orbiting satellites which follow one another in a substantially continuous ground track on the earth, wherein said satellites have repeating ground tracks wherein a satellite completes n orbital revolutions each time the earth rotates through 360 degrees, wherein n is an integer between 2 and 15, inclusive, and a plurality of ground terminals, each having substantially continuous visibility to at least one of said satellites in a single ground track.

* * * * *